United States Patent
Doering et al.

(10) Patent No.: US 11,572,844 B2
(45) Date of Patent: Feb. 7, 2023

(54) METHODS AND SYSTEM FOR STOPPING AN INTERNAL COMBUSTION ENGINE

(71) Applicant: Ford Global Technologies, LLC, Dearborn, MI (US)

(72) Inventors: Jeffrey Allen Doering, Canton, MI (US); Chris Paul Glugla, Macomb, MI (US); Imtiaz Ali, Lathrup Village, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 177 days.

(21) Appl. No.: 16/799,088

(22) Filed: Feb. 24, 2020

(65) Prior Publication Data
US 2021/0262410 A1  Aug. 26, 2021

(51) Int. Cl.
| F02D 41/04 | (2006.01) |
| F02D 41/38 | (2006.01) |
| F02D 41/00 | (2006.01) |
| F02P 5/06 | (2006.01) |

(52) U.S. Cl.
CPC ......... *F02D 41/042* (2013.01); *F02D 41/009* (2013.01); *F02D 41/38* (2013.01); *F02P 5/06* (2013.01); *F02D 2041/389* (2013.01); *F02D 2200/021* (2013.01); *F02D 2200/023* (2013.01); *F02D 2200/024* (2013.01); *F02D 2200/0602* (2013.01); *F02D 2200/101* (2013.01)

(58) Field of Classification Search
CPC ......... F02D 2041/389; F02D 2200/021; F02D 2200/023; F02D 2200/024; F02D 2200/0602; F02D 2200/101; F02D 41/009; F02D 41/042; F02D 41/123; F02D 41/1497; F02D 41/38; F02N 19/005; F02N 2019/008; F02P 5/06; F02P 5/153
See application file for complete search history.

(56) References Cited

U.S. PATENT DOCUMENTS

| 2007/0062476 A1* | 3/2007 | Ota ........................ F02B 23/104 123/179.4 |
| 2009/0118991 A1* | 5/2009 | Ueda .................... F02D 41/3836 701/112 |
| 2013/0000599 A1* | 1/2013 | Okamoto .............. F02D 41/008 123/295 |
| 2016/0230734 A1* | 8/2016 | Murakami ............ F02D 41/042 |
| 2016/0265500 A1* | 9/2016 | Suzuki .................. F02N 99/006 |

(Continued)

OTHER PUBLICATIONS

Doering, J. et al., "Method for Starting an Engine," U.S. Appl. No. 16/551,662, filed Aug. 26, 2019, 46 pages.

(Continued)

*Primary Examiner* — Grant Moubry
*Assistant Examiner* — Ruben Picon-Feliciano
(74) *Attorney, Agent, or Firm* — Vincent Mastrogiacomo; McCoy Russell LLP

(57) ABSTRACT

A method for stopping an engine within a desired crankshaft angular range is disclosed. In one example, the method may take no control actions if it is determined that the engine will stop within the desired crankshaft angular range. However, if it is determined that the engine may stop outside of the desired crankshaft angular range, expansion combustion may be initiated in a cylinder so that the engine stops in a desired crankshaft angular range.

20 Claims, 4 Drawing Sheets

(56) References Cited

U.S. PATENT DOCUMENTS

2017/0241365 A1* 8/2017 Okazaki .................. F02D 17/04

OTHER PUBLICATIONS

Doering, J. et al., "Methods and System for Starting an Internal Combustion Engine," U.S. Appl. No. 16/829,291, filed Mar. 25, 2020, 48 pages.
Banker, A. et al., "Methods and System for a Stop/Start Vehicle," U.S. Appl. No. 16/804,592, filed Feb. 28, 2020, 40 pages.

* cited by examiner

METHODS AND SYSTEM FOR STOPPING AN INTERNAL COMBUSTION ENGINE

FIELD

The present description relates to methods and a system for stopping an internal combustion engine at a crankshaft position that may improve engine starting. The methods and systems provide for selectively performing expansion combustion in a cylinder after an engine stop request.

BACKGROUND AND SUMMARY

An internal combustion engine may be stopped from rotating via ceasing to deliver fuel to engine cylinders. Once fuel delivery is stopped, the engine may combust fuel and air mixtures that are within the engine. The engine may continue to rotate briefly after remaining air-fuel mixtures within the cylinders have been combusted. The engine speed may decline as torque from combusting air-fuel mixtures within the engine ceases to be generated. The crankshaft angle at which the engine is stopped may be a function of many variables including but not limited to engine speed at time of engine stop request, engine temperature, valve timing, and throttle opening amount. The engine may have a natural tendency to stop at two positions:
  1) at a crankshaft angle near where the volume of one cylinder that is on a compression stroke is nearly equal to the volume of one cylinder that is on an expansion stroke, or
  2) when one cylinder is at top dead center.

There are certain engine stopping position that are more favorable to engine starting; these positions vary with the details of the engine (number of cylinders, valve timing, . . . ). The required cranking torque from a starter motor or clutch will be lower when the engine stops at specific crankshaft angles. Injecting fuel and igniting in a cylinder on the expansion stroke (e.g., 'Expansion Combustion') varies in reliability and the ability to provide meaningful cranking work when the engine is stopped with some cylinder in a range of positions on its exhaust stroke. However, from time to time, the engine may also stop at a crankshaft angle where it may be more difficult to crank the engine or provide useful work from Expansion Combustion. Especially for 4 and 6 cylinder engines, the first stopping position is greatly preferred and the second stopping position is to be avoided. If the engine were to consistently stop at the crankshaft angle where it is easier to crank, then the starter motor's torque capacity may be reduced while ability to crank the engine is preserved. As a result, engine system cost may be reduced while engine cranking functionality may be preserved.

The inventors herein have recognized the above-mentioned tendency of the engine to sometimes stop at undesirable positions and have developed a method for operating an engine, comprising: injecting a fuel to a cylinder that is on an expansion stroke, the fuel injected in response to an engine stop request, engine speed being greater than a first threshold speed and less than a second threshold speed, and fuel injection to the engine being ceased.

By injecting fuel to a cylinder that is on an expansion stroke and that is a latest or most recent cylinder entering its expansion stroke, it may be possible to provide the technical result of reducing engine cranking torque so that an engine may be reliably started with a starter motor having a lower torque capacity. In particular, the engine may be rotated to a crankshaft angle where it may be easier to crank. Further, the engine may be restarted via expansion combustion in a cylinder that is adjacent to the cylinder that received fuel in its expansion stroke just before the engine stopped rotating to reduce engine cranking time.

The present description may provide several advantages. In particular, the approach may allow a smaller starter motor to start an engine. In addition, the approach may make engine starting more reliable or more consistent.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 4:
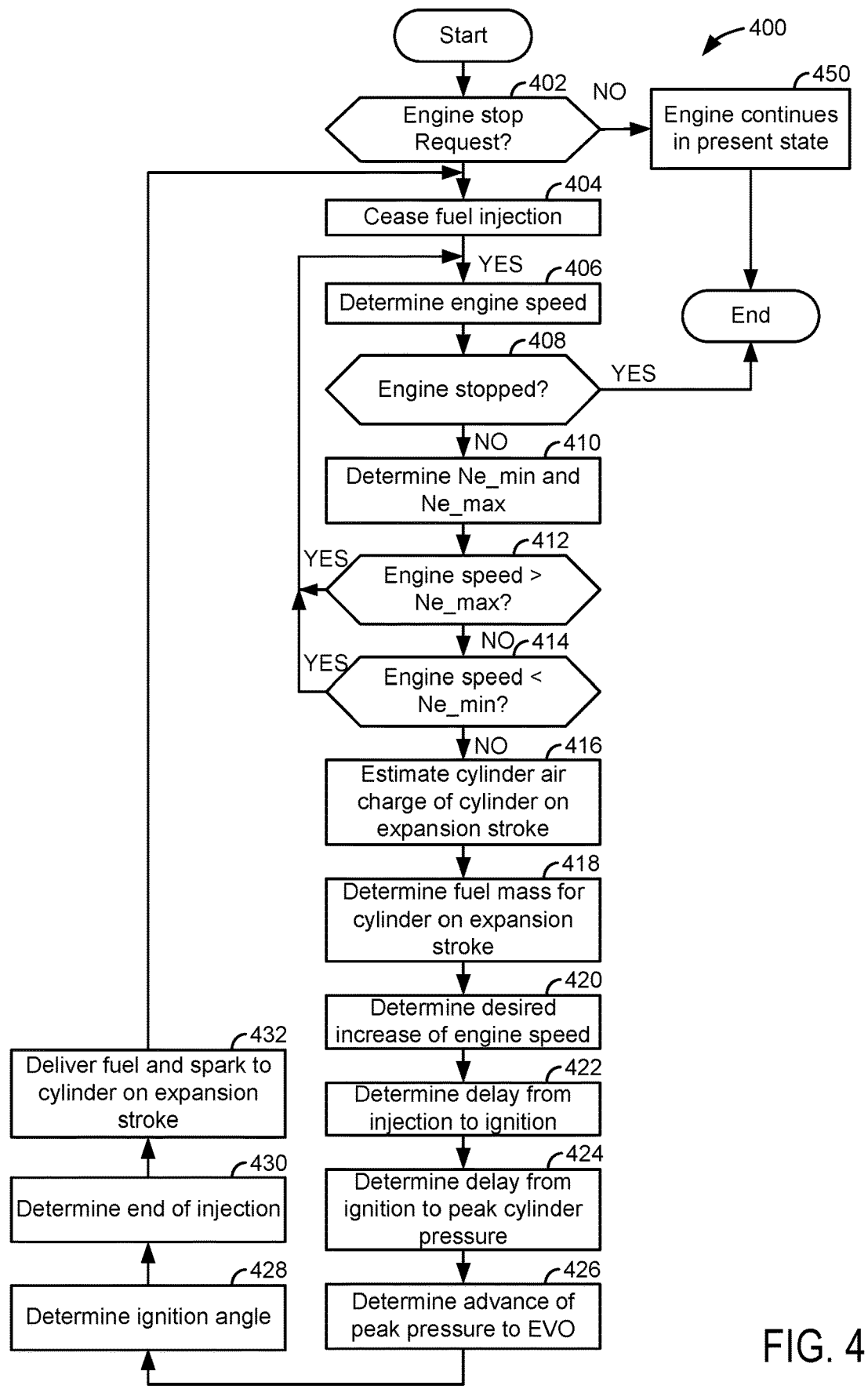
FIG. 4 shows a flowchart of an example method for stopping an engine.

The present description is related to stopping an internal combustion engine within a desired crankshaft angular window. The engine may be stopped in a desired crankshaft window by performing expansion combustion in a cylinder when it is expected that the engine will stop at less desirable crankshaft angle if no additional torque is applied to the engine to extend the engine rotation. The engine may be of the type shown in FIG. 1. The engine may stop rotating at a crankshaft angle according to the method of FIG. 4 without expansion combustion in a cylinder as shown in FIG. 2 when engine speed indicates that the engine will stop within a desired crankshaft angular window. The engine may stop rotating at a crankshaft angle according to the method of FIG. 4 with expansion combustion when engine speed indicates that the engine will not initially stop within the desired crankshaft angular window. A method for stopping rotation of an engine within a desired crankshaft angular window is shown in FIG. 4.

Figure 1:
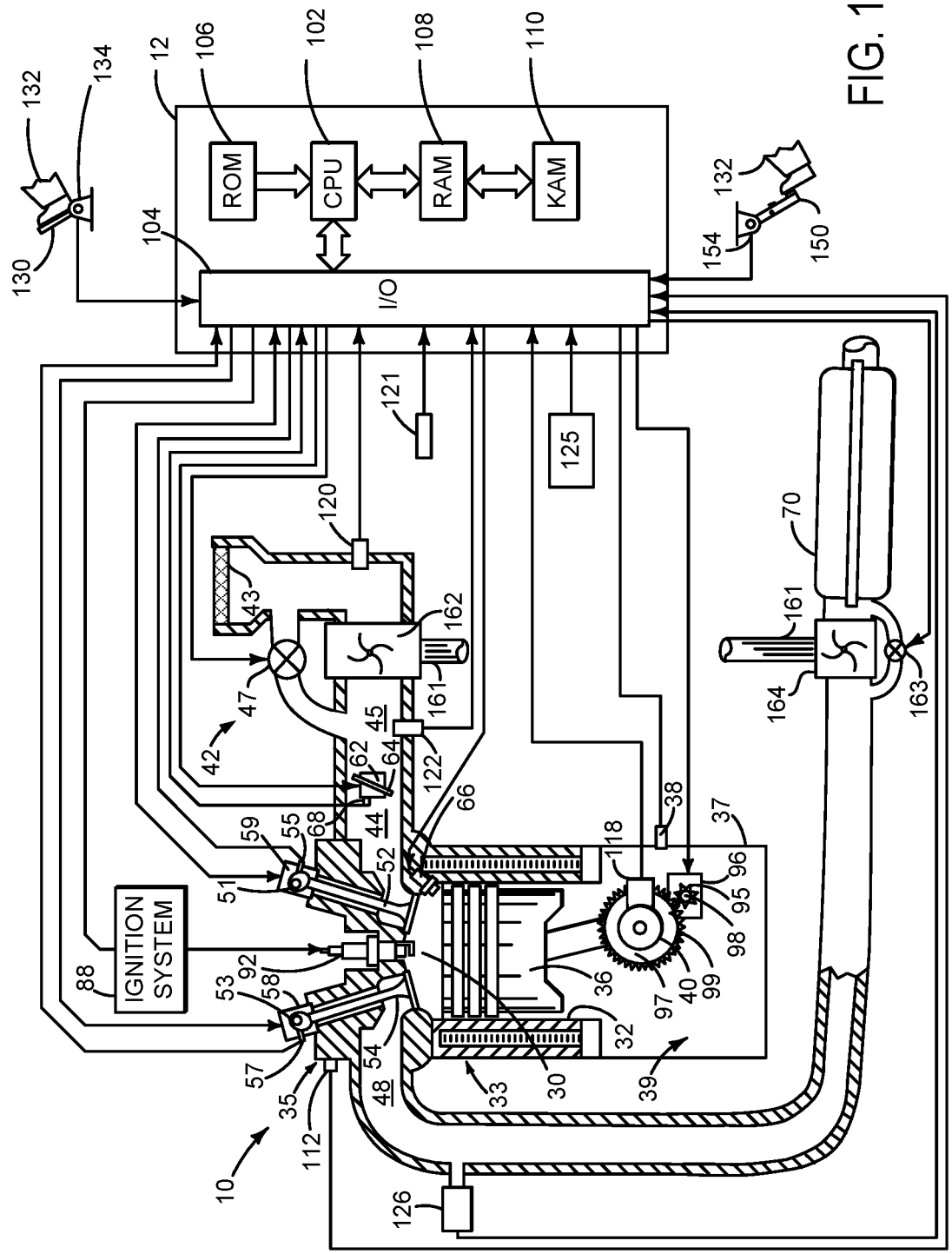
FIG. 1 shows a schematic diagram of an internal combustion engine.
Figure 2:
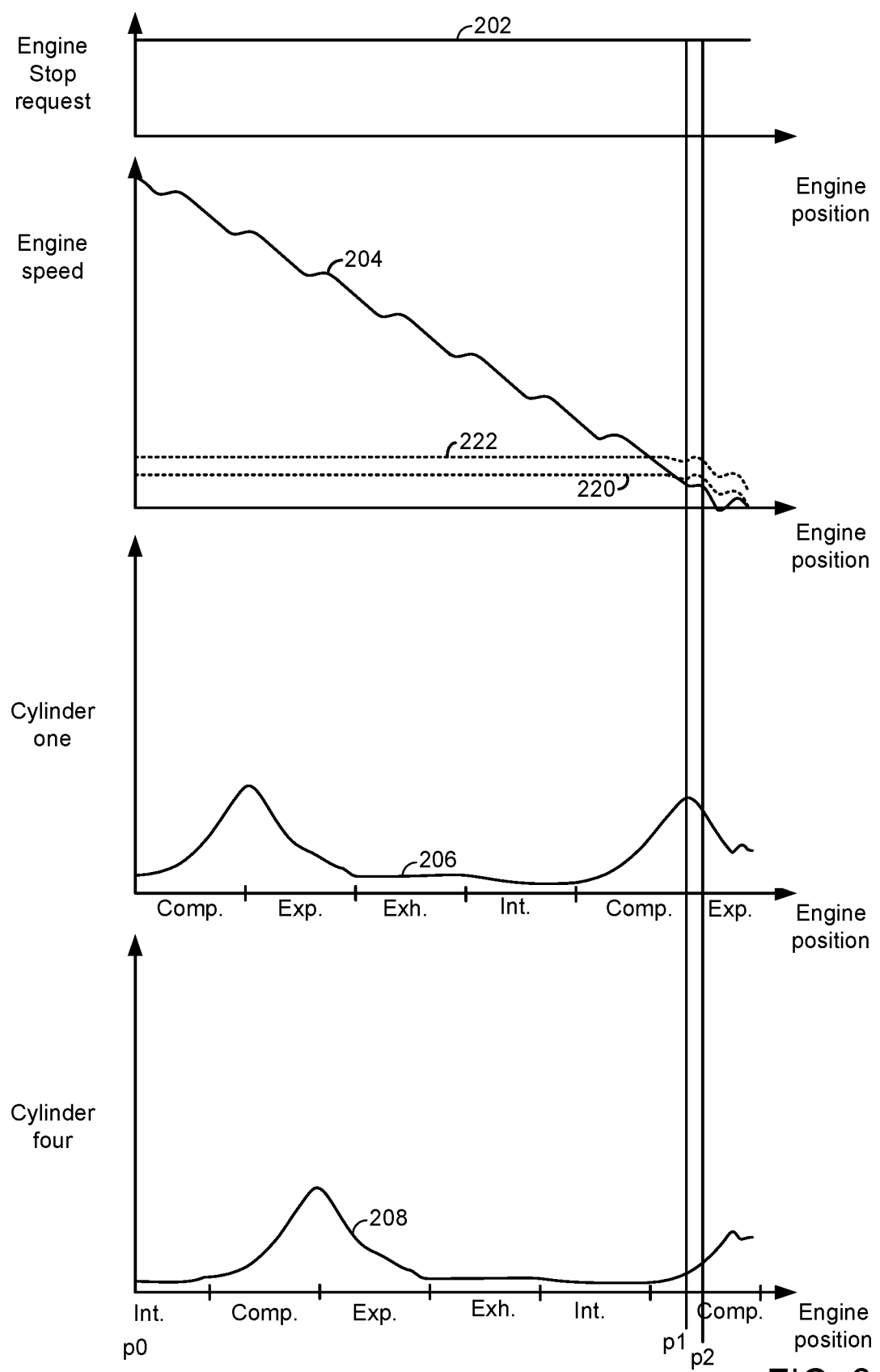
FIG. 2 shows an example engine stopping sequence according to the present description where the engine stops within a desired crankshaft window without performing expansion combustion.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 20 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain.

In one example, starter 96 is in a base state when not engaged to the engine crankshaft.

Combustion chamber 30 is shown communicating with intake manifold 44 and exhaust manifold 48 via respective intake poppet valve 52 and exhaust poppet valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. A lift amount and/or a phase or position of intake valve 52 may be adjusted relative to a position of crankshaft 40 via valve adjustment device 59. A lift amount and/or a phase or position of exhaust valve 54 may be adjusted relative to a position of crankshaft 40 via valve adjustment device 58. Valve adjustment devices 58 and 59 may be electro-mechanical devices, hydraulic devices, or mechanical devices.

Engine 10 includes a crankcase 39 that houses crankshaft 40. Oil pan 37 may form a lower boundary of crankcase 39 and engine block 33 and piston 36 may constitute an upper boundary of crankcase 39. Crankcase 39 may include a crankcase ventilation valve (not shown) that may vent gases to combustion chamber 30 via intake manifold 44. A temperature of oil in crankcase 39 may be sensed via temperature sensor 38.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: cylinder head temperature from temperature sensor 112 coupled to cylinder head 35; a position sensor 134 coupled to an accelerator pedal 130 for sensing force applied by human foot 132; a position sensor 154 coupled to brake pedal 150 for sensing force applied by foot 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; a measurement of fuel rail pressure from sensor 121; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input via human/machine interface 125. Human/machine interface may be a touch screen panel, key switch, push button, or other known input device. Human/machine interface 125 may also display messages to vehicle passengers.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

The system of FIG. 1 provides for a vehicle system, comprising: an internal combustion engine; a controller including executable instructions stored in non-transitory memory that cause the controller to inject a fuel to a cylinder of the internal combustion engine that is on an expansion stroke, combust the fuel during the expansion stroke, in response to a speed of the internal combustion engine being above a first speed threshold and below a second speed threshold in response to a request to stop the internal combustion engine and after ceasing fuel flow to cylinders of the internal combustion engine. The vehicle system further comprises additional executable instructions to determine a delay time between an end of injecting the fuel to the cylinder and generating a spark in the cylinder. The vehicle system further comprises additional executable instructions to determine a delay time from a time of generating the spark to a time of a peak pressure in the cylinder during the expansion stroke. The vehicle system further comprises additional executable instructions to determine an advance of the peak pressure in the expansion stroke from a first subsequent exhaust valve opening time for the cylinder after the peak pressure is generated. The vehicle system further comprises additional executable instructions to not inject the fuel in response to in response to the speed of the internal combustion engine being below the first speed threshold. The vehicle system includes where the speed of the engine is determined within a predetermined crankshaft angular window of the expansion stroke. The vehicle system further comprises additional instructions to estimate a cylinder air charge in the cylinder after the engine stop request.

Referring now to FIG. 2, a plot of a prophetic example engine stopping sequence according to the method of FIG. 4 is shown. The engine stopping sequence that is shown in FIG. 2 may be provided via the system of FIG. 1 in cooperation with the method of FIG. 4. The vertical lines at engine positions p0-p2 represent engine positions of interest during the engine stopping sequence. The four plots shown in FIG. 2 are aligned according to engine position. In this example, the engine is a four stroke V6 engine with 120 crankshaft degrees between top-dead-center compression strokes of the engine's cylinders. The engine's firing order is 1-4-3-6-2-5.

The first plot from the top of FIG. 2 is a plot of an engine stop request state versus engine position. The vertical axis represents the engine stop request state and the engine stop request state is asserted (e.g., an engine stop is requested) when trace 202 is near the level of the vertical axis arrow. Trace 202 represents the engine stop request state. The horizontal axis represents engine position and engine position increases from the left side of the plot to the right side of the plot.

The second plot from the top of FIG. 2 is a plot of engine speed versus time. The vertical axis represents engine speed and the engine speed increases in the direction of the vertical axis arrow. Trace 204 represents the engine speed. The horizontal axis represents engine position and engine position increases from the left side of the plot to the right side of the plot. Line 222 represents a maximum threshold engine speed above which expansion combustion is not applied to change the engine stopping position. Line 220 represents a minimum threshold engine speed below which expansion combustion is not applied to change the engine stopping position.

The third plot from the top of FIG. 2 is a plot of pressure in a first cylinder of an engine that is on an expansion stroke when engine speed is less than a threshold speed a first time since a most recent engine stop request. The vertical axis represents pressure in the cylinder. The cylinder in this example is cylinder number one because cylinder number one is the first cylinder on an expansion stroke when engine speed is less than a threshold speed after a most recent engine stop request. Trace 206 represents the pressure in cylinder number one. The horizontal axis represents engine position and engine position increases from the left side of the plot to the right side of the plot.

The fourth plot from the top of FIG. 2 is a plot of pressure in a second cylinder of an engine that is on an expansion stroke when engine speed is less than a threshold speed a first time since a most recent engine stop request. The vertical axis represents pressure in the cylinder. The cylinder in this example is cylinder number four because cylinder number four is the second cylinder on an expansion stroke when engine speed is less than a threshold speed after a most recent engine stop request. Trace 208 represents the pressure in cylinder number four. The horizontal axis represents engine position and engine position increases from the left side of the plot to the right side of the plot.

At engine position p0, the engine is rotating, but it is not combusting fuel since the engine stop request is asserted. The engine speed is elevated, but it is decelerating. Pressure in cylinder number one is increasing and cylinder number one is on a compression stroke. Pressure in cylinder number four is low and cylinder number four is on an intake stroke.

Between engine position p0 and engine position p1, the engine continues to decelerate and cylinder number one rotates through an engine cycle (e.g., four strokes). Engine speed falls below threshold 220 before engine position p1 is reached by the engine so that when engine stopping position is predicted, it is determined that the engine will stop within a predetermined crankshaft angle range. The threshold 220 may vary as a function of engine position. In this example, cylinder number one enters its expansion stroke shortly before the engine reaches engine position p1, so the engine stopping position is evaluated based on the engine speed during the expansion stroke of cylinder number one. Cylinder number four also rotates through the engine cycle and it enters a compression stroke just before the engine rotates to engine position p1.

At engine position p1, the engine crankshaft enters a predetermined crankshaft window interval of the first cylinder entering its expansion stroke. Method 400 may evaluate engine speed in any window of engine rotation (e.g. the period of one or more teeth on a crank position wheel) or each time the engine rotates through a crankshaft angular range of a cylinder that is on its expansion stroke. In one example, the crankshaft window may range from fifteen crankshaft degrees after top-dead-center expansion stroke to 165 crankshaft degrees after top-dead-center expansion stroke of the cylinder that is on its expansion stroke. However, in other examples, the predetermined crankshaft angular window interval may range in duration of 1-3 crankshaft wheel teeth, and the predetermined crankshaft angular window may be evaluated at several engine positions. The method determines the engine speed during the predetermined crankshaft window of the cylinder that is on its expansion stroke. In this example, engine speed 204 is less than the minimum threshold engine speed 220 when cylinder number one is beginning on its expansion stroke, so it is estimated that the engine will stop during the expansion stroke of cylinder number one within a desirable crankshaft angular range. Therefore, no control action is taken (e.g., expansion combustion is not performed) and the engine continues to decelerate. The engine stops shortly after the engine position exits the predetermined crankshaft angle window that ends for cylinder number one at engine position p2. Cylinder number four stops about half way through its compression stroke so that the force of pressure of compressed air in cylinder number four cancels out force of compressed air in cylinder number one, thereby producing a force balance that causes the engine to stop. The crankshaft position at which force due to air charge in a first cylinder balances (e.g., is nearly equal and opposite) with force due to air charge in a second cylinder may be a desirable engine stopping position since it may allow the starter motor to accelerate the engine before peak pressure is achieved in a cylinder. Consequently, the engine may be cranked or rotated via a starter with less torque as compared to if the engine stopped with a cylinder near top-dead-center compression stroke.

In this way, if engine speed is less than a threshold speed when a cylinder enters its expansion stroke, the engine may be stopped without performing expansion combustion in an engine cylinder to control engine position during an engine stop. If the engine speed is greater than threshold 222, the engine is likely to have enough kinetic energy to rotate past the next compression TDC (cylinder 4 in this example) and expansion combustion is not required on cylinder 1's expansions stroke.

Figure 3:
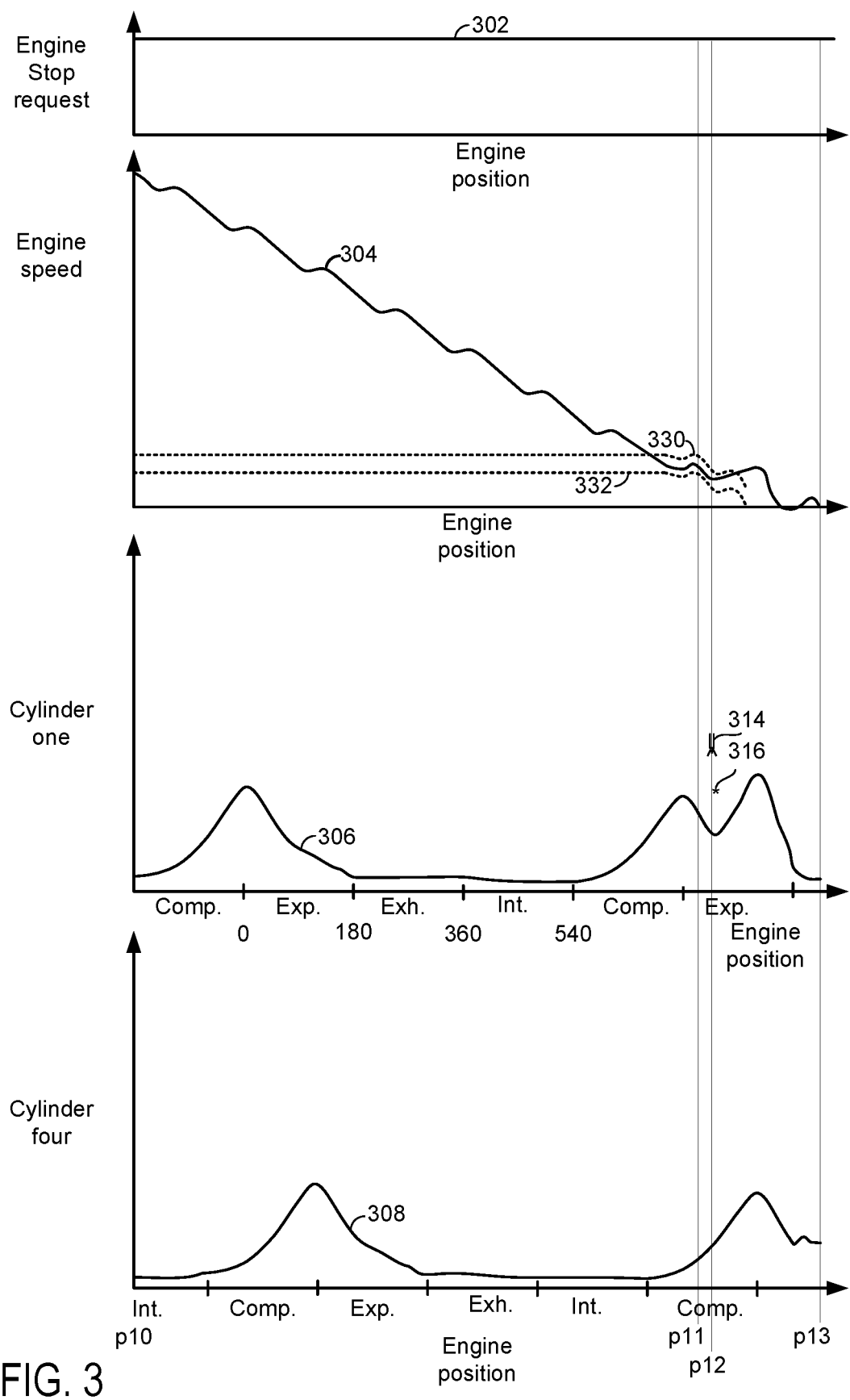
FIG. 3 shows an example engine stopping sequence according to the present description where the engine stops within a desired crankshaft window via performing expansion combustion.

Referring now to FIG. 3, a plot of a second prophetic example engine stopping sequence according to the method of FIG. 4 is shown. The engine stopping sequence that is shown in FIG. 3 may be provided via the system of FIG. 1 in cooperation with the method of FIG. 4. The vertical lines at engine positions p10-p13 represent engine positions of interest during the engine stopping sequence. The four plots shown in FIG. 3 are aligned according to engine position. In this example, the engine is a four stroke V6 engine with 120 crankshaft degrees between top-dead-center compression strokes of the engine's cylinders. The engine's firing order is 1-4-3-6-2-5.

The first plot from the top of FIG. 3 is a plot of an engine stop request state versus engine position. The vertical axis represents the engine stop request state and the engine stop request state is asserted (e.g., an engine stop is requested) when trace 302 is near the level of the vertical axis arrow. Trace 302 represents the engine stop request state. The horizontal axis represents engine position and engine position increases from the left side of the plot to the right side of the plot.

The second plot from the top of FIG. 3 is a plot of engine speed versus time. The vertical axis represents engine speed and the engine speed increases in the direction of the vertical axis arrow. Trace 304 represents the engine speed. The horizontal axis represents engine position and engine position increases from the left side of the plot to the right side of the plot. Line 330 represents a maximum threshold engine speed above which expansion combustion is not applied to change the engine stopping position. Line 332 represents a minimum threshold engine speed below which expansion combustion is not applied to change the engine stopping position.

The third plot from the top of FIG. 3 is a plot of pressure in a first cylinder of an engine that is on an expansion stroke when engine speed is less than a threshold speed a first time since a most recent engine stop request. The vertical axis represents pressure in the cylinder. The cylinder in this example is cylinder number one because cylinder number one is the first cylinder on an expansion stroke when engine speed is less than a threshold speed after a most recent engine stop request. Trace 306 represents the pressure in cylinder number one. The horizontal axis represents engine position and engine position increases from the left side of the plot to the right side of the plot.

The fourth plot from the top of FIG. 3 is a plot of pressure in a second cylinder of an engine that is on an expansion stroke when engine speed is less than a threshold speed a first time since a most recent engine stop request. The vertical axis represents pressure in the cylinder. The cylinder in this example is cylinder number four because cylinder number four is the second cylinder on an expansion stroke when engine speed is less than a threshold speed after a most recent engine stop request. Trace 308 represents the pressure in cylinder number four. The horizontal axis represents engine position and engine position increases from the left side of the plot to the right side of the plot.

At engine position p10, the engine is rotating, but it is not combusting fuel since the engine stop request is asserted. The engine speed is elevated, but it is decelerating. Pressure in cylinder number one is increasing and cylinder number one is on a compression stroke. Pressure in cylinder number four is low and cylinder number four is on an intake stroke.

Between engine position p10 and engine position p11, the engine continues to decelerate and cylinder number one rotates through an engine cycle (e.g., four strokes). Engine speed falls below threshold 330, but it remains above threshold 332 before engine position p11 is reached by the engine so that when engine stopping position is predicted, it is determined that the engine will not stop within a predetermined desirable crankshaft angle range. In this example, cylinder number one enters its expansion stroke shortly before the engine reaches engine position p11, so the engine stopping position is evaluated based on the engine speed during the expansion stroke of cylinder number one. Cylinder number four also rotates through the engine cycle and it enters a compression stroke just before the engine rotates to engine position p11.

At engine position p11, the engine crankshaft enters a predetermined crankshaft window interval of the first cylinder entering its expansion stroke. Method 400 may evaluate engine speed each time the engine rotates through a crankshaft angular range of a cylinder that is on its expansion stroke. The method determines the engine speed during the predetermined crankshaft window of the cylinder that is on its expansion stroke. In this example, engine speed 304 is less than the maximum threshold engine speed 330 and greater than the minimum threshold engine speed 332 when cylinder number one is on its expansion stroke, so it is estimated that the engine will not stop during the expansion stroke of cylinder number one within the desirable crankshaft angular range and will not continue to rotate far enough to reach the desired angular range on the next cylinder's expansion stroke. Therefore, fuel is injected at 314 and shortly thereafter, combustion is generated in cylinder number one at 316. Fuel is injected and combusted during an expansion stroke of cylinder number one. The combustion in cylinder number one increases the kinetic energy of the engine and it allows the engine to rotate through top-dead-center compression stroke of cylinder number one. By increasing rotation of the engine, it may be possible for the engine to stop within a desired crankshaft angle range where one cylinder's volume during a compression stroke of the cylinder is nearly equal to volume of another cylinder that is on its expansion stroke. Such an engine stopping crankshaft angle may allow a starter with a lower torque capacity to rotate and start the engine reliably. In this example, the expansion combustion occurs after engine position p12; however, in some examples, the expansion combustion may be initiated within the crankshaft window where engine stopping position may be assessed (e.g., between engine position p11 and engine position p12).

Between engine position p12 and engine position p13, pressure in cylinder number one increases due to expansion combustion. The expansion combustion causes the engine to rotate so that cylinder number four enters its expansion stroke. Cylinder number one rotates through its expansion stroke and into its exhaust stroke. Pressure also increases in cylinder number four, but combustion does not occur in cylinder number four and fuel is not injected into cylinder number four.

At engine position p13, the engine ceases rotating and cylinder number four is on its expansion stroke. Cylinder number one is on its exhaust stroke and the engine stop request remains asserted.

In this way, if engine speed is less than a first threshold speed and greater than a second threshold speed when a cylinder enters its expansion stroke, expansion combustion may be initiated in the engine after the engine stop request has been asserted. The expansion combustion provides energy to rotate the engine through an undesirable engine crankshaft stopping position and into a desirable engine crankshaft stopping position.

Referring now to FIG. 4, a method for stopping an engine at a crankshaft angle that may be desirable for restarting the engine is shown. It may be desirable to stop the engine at a crankshaft angle where one cylinder's expansion stroke volume (e.g., the cylinder volume between the cylinder's piston and cylinder head) is nearly equal (e.g., within 20%) of a volume of a different cylinder that is on its compression stroke so that air charge amounts within the two cylinders is similar. Such an engine stopping crankshaft angular range may allow the engine to be cranked via a starter motor with a lower torque capacity and/or to start via expansion combustion. At least portions of method 400 may be implemented as executable controller instructions stored in non-transitory memory. Method 400 may operate in cooperation with the system of FIG. 1. Additionally, portions of method 400 may be actions taken in the physical world to transform an operating state of an actuator or device. The method of FIG. 4 may be incorporated into the system of FIG. 1 as executable instructions stored in non-transitory memory.

At 402, method 400 judges if an engine stop (e.g., stop engine rotation) is requested. Method 400 may judge that the engine is stop is requested via assessing status of a human user input or human/machine interface. Further, method 400 may judge that an engine stop is requested via a control via a state of a controller input or a value of a variable that is stored in controller memory. If method 400 judges that the engine stop is requested, the answer is yes and method 400 proceeds to 404. Otherwise, the answer is no and method 400 proceeds to 450.

At 450, method 400 continues to operate the engine (e.g., rotate the engine and combust fuel within the engine) if the engine is already operating. If the engine is not operating (e.g., not rotating and not combusting fuel), then the engine remains not operating.

If the engine is stopped and an engine restart is requested, the engine may be restarted by performing a first fuel injection into a cylinder since the most recent engine stop. The first fuel injection may be made into a cylinder that is on its expansion stroke so that engine starting time may be shortened. The cylinder that is on its expansion stroke when the engine is stopped (e.g., not rotating) may be adjacent in a firing order of the engine to a second cylinder that received fuel during the second cylinder's expansion stroke during the last engine stop sequence. Method 400 proceeds to exit.

At 404, method 400 ceases to inject fuel to engine cylinders so that engine rotation and combustion within the engine may cease. Method 400 may cease to inject fuel to the engine via closing fuel injectors. Method 400 proceeds to 406.

At 406, method 400 determines engine speed. Engine speed may be determined at a high resolution so that changes in engine speed may be quickly determined. For example, method 400 may calculate engine speed each time a tooth of a crankshaft wheel is observed. Thus, for a 60 tooth crankshaft wheel, engine position may be determined every 6 crankshaft degrees. Engine speed may be determined each time engine position is determined according to the time it takes for the engine to rotate through one crankshaft tooth. Method 400 proceeds to 408 after engine speed is determined.

At 408, method 400 determines whether or not the engine is stopped. Method 400 may determine that the engine is stopped if engine speed is less than a threshold speed (e.g., 5 RPM). If method 400 judges that the engine is stopped, the answer is yes and method 400 proceeds to exit. Otherwise, the answer is no and method 400 proceeds to 410.

At 410, method 400 determines a minimum engine speed at which the engine will not rotate through top-dead-center compression stroke of the next cylinder in order of combustion relative to the cylinder that is presently on and the latest cylinder to enter its expansion stroke (e.g., referred to herein after as the "minimum engine speed"). For example, if the engine is a six cylinder four stroke engine having a firing order of 1-4-3-6-2-5 and cylinder number one is presently on and the latest cylinder to enter its expansion stroke, then the minimum engine speed is an engine speed at which the engine will not rotate into the expansion stroke of cylinder number four. In other words, for engine speeds below the minimum engine speed, the engine will not rotate into the expansion stroke of cylinder number four.

Method 400 also determines a maximum engine speed at which the engine will rotate through top-dead-center compression stroke of the next cylinder in order of combustion relative to the cylinder that is presently on and the latest cylinder to enter its expansion stroke (e.g., referred to herein after as the "maximum engine speed"). For example, if the engine is a six cylinder four stroke engine having a firing order of 1-4-3-6-2-5 and cylinder number one is presently on and the latest cylinder to enter its expansion stroke, then the maximum engine speed is an engine speed at which the engine will rotate into the expansion stroke of cylinder number four. In other words, for engine speeds above the maximum engine speed, the engine will rotate into the expansion stroke of cylinder number four without aid of expansion combustion.

In one example, method 400 determines the minimum and maximum engine speeds via referencing a minimum engine speed table or function and a maximum engine speed table or function. The tables or functions may be referenced or indexed via engine operating conditions that may include, but are not limited to barometric pressure, engine position, engine oil temperature, and engine coolant temperature. Values that are stored in the table or function may be empirically determined via stopping an engine at different engine operating conditions and observing engine speed and the engine's final stopping crankshaft angle. Method 400 proceeds to 412 after determining the minimum and maximum engine speeds.

At 412, method 400 determines if the present engine speed is greater than the maximum engine speed. Method 400 may determine the present engine speed and if the present engine speed is greater than the maximum engine speed within at a predetermined crankshaft angle of the cylinder that has most recently entered its expansion stroke (e.g., in a crankshaft window between 15 and 165 crankshaft degrees after top-dead-center compression stroke of the cylinder that has most recently entered its expansion stroke). If method 400 judges that the present engine speed is greater than the maximum engine speed, the answer is yes and method 400 returns to 406. Otherwise, the answer is no and method 400 proceeds to 414. If method 400 judges that the answer is yes, method 400 has judged that the engine is not expected to stop rotating during the expansion stroke of the cylinder that has most recently entered its expansion stroke so there is no need for expansion combustion in the cylinder to ensure that the engine stops at a desired crankshaft angle.

At 414, method 400 determines if the present engine speed is less than the minimum engine speed. Method 400 may determine the present engine speed and if the present engine speed is less than the minimum engine speed within at a predetermined crankshaft angle of the cylinder that has most recently entered its expansion stroke. If method 400 judges that the present engine speed is less than the minimum engine speed, the answer is yes and method 400 returns to 406. Otherwise, the answer is no and method 400 proceeds to 416. If method 400 judges that the answer is yes, method 400 has judged that the engine is expected to stop rotating in a desirable crankshaft angle range during the expansion stroke of the cylinder that has most recently entered its expansion stroke so there is no need for expansion combustion in the cylinder to ensure that the engine stops at the desired crankshaft angle.

At 416, method 400 determines an amount of air that is contained within the engine cylinder that is in its expansion stroke and that has most recently entered its expansion stroke. For example, if cylinder number one has just rotated through its top-dead-center compression stroke and it has just entered its expansion stroke, then method 400 determines an amount of air that is in cylinder number one. In one example, method 400 estimates the amount of air that is in the cylinder that is in its expansion stroke and that has most recently entered its expansion stroke via a function that is referenced via intake manifold pressure, intake valve closing crankshaft angle, intake manifold temperature, ambient air temperature, and engine temperature. In one example, values stored within the function may be determined via the ideal gas law (e.g., pV=NRT), the values in the function may be adjusted as a function of engine temperatures and ambient air temperature. For example, the cylinder air charge may be expressed as:

$$\text{Cyl\_air\_chg} = f(Ta, Te, IVC, MAP, Tm)$$

where Cyl_air_chg is the cylinder air charge, f is the function that returns the value of the cylinder air charge, Ta is ambient air temperature, Te is engine temperature, Tm is intake manifold temperature, IVC is the crankshaft angle at which the intake valve closes, and MAP is the intake manifold pressure. Method 400 proceeds to 418.

At 418, method 400 determines a mass of fuel to inject to the cylinder that is on its expansion stroke and that is the most recent cylinder to enter its expansion stroke. In one example, method 400 determines the amount of fuel to inject based on the amount of air that is determined at 416 and a desired Lambda (e.g., normalized air/fuel ratio) value. The desired Lambda value may be a function of engine temperature. For example, the desired cylinder air-fuel ratio may be determined via multiplying the desired Lambda value by the stoichiometric air-fuel ratio. The fuel mass may then be determined by dividing the air mass determined at 416 by the desired cylinder air-fuel ratio. Method 400 proceeds to 420 after determining the mass of fuel to inject to the cylinder that is on its expansion stroke and that is the cylinder that has most recently entered its expansion stroke.

At 420, method 400 determines a desired increase in the engine's kinetic energy due to expansion combustion in the cylinder that is on its expansion stroke and is the engine cylinder that has most recently entered its expansion stroke. In one example, method 400 references a function that contains empirically determined values of engine speed increase amounts. The function may be referenced or indexed via present engine speed, engine position, engine oil temperature, engine coolant temperature, and barometric pressure. Values in the function may be empirically determined via performing expansion combustion in engine cylinders and monitoring the increase in engine speed. Method 400 proceeds to 422.

At 422, method 400 determines a desired delay (e.g., in crankshaft degrees) from end of fuel injection crankshaft angle to ignition or spark angle (e.g., Ign_dly). In one example, method 400 references a function that contains empirically determined values of desired ignition delay times. The function may be referenced or indexed via present engine speed, engine oil temperature, and fuel rail pressure. Values in the function may be empirically determined via performing expansion combustion in engine cylinders and adjusting spark crankshaft timing relative to end of fuel injection crankshaft timing. Values that are input to the function may be values that generate the desired engine speed increase. Method 400 proceeds to 424.

At 424, method 400 determines a delay (e.g., comb_dly in crankshaft degrees) from ignition crankshaft angle (e.g., crankshaft angle spark is initiated in the cylinder receiving the fuel) to a crankshaft angle when pressure in the cylinder receiving the fuel reaches a peak cylinder pressure during the expansion stroke. In one example, method 400 references a function that contains empirically determined values of peak cylinder pressure delay. The function may be referenced or indexed via present engine speed and engine temperature. Values in the function may be empirically determined via performing expansion combustion in engine cylinders and monitoring locations and delay time between ignition and peak cylinder pressure during the expansion stroke of the cylinder that received the fuel. Method 400 proceeds to 426

At 426, method 400 determines a desired advance of peak cylinder pressure in the cylinder receiving the fuel relative to exhaust valve opening crankshaft angle for the cylinder receiving the fuel. In one example, the advance of peak cylinder pressure in the cylinder receiving the fuel may be determined via the following equation:

$$\text{Peak\_pres\_adv} = f(\text{delta\_Ne}, N, \text{Cyl\_air\_chg}, Lam, Te)$$

where Peak_pres_adv is the advance of peak cylinder pressure from exhaust valve opening crankshaft angle of the cylinder receiving the fuel, f is a function that returns a value of the advance of peak cylinder pressure from exhaust valve opening crankshaft angle of the cylinder receiving the fuel, delta_Ne is the desired increase in engine speed as determined at 420, N is the present engine speed, Cyl_air_chg is the amount of air in the engine cylinder receiving the fuel, Lam is the Lambda value for the cylinder (e.g., air-fuel ratio/stoichiometric air-fuel ratio), and Te is engine temperature. Values stored in the function f may be determined via performing expansion combustion in an engine cylinder during engine stopping and recording peak pressure advance locations that generate the desired engine speed increase. Method 400 proceeds to 428.

At 428, method 400 determines an ignition crankshaft angle at which spark is delivered to the cylinder receiving the fuel. In one example, method 400 determines the ignition angle via the following equation:

$$\text{Ign\_ang} = \text{EVO} - \text{Peak\_pres\_adv} - \text{comb\_dly}$$

where Ign_ang is the ignition crankshaft angle, EVO is exhaust valve opening crankshaft angle, Peak_pres_adv is the peak pressure advance relative to EVO as determined at 426, and comb_dly is the combustion delay from ignition (e.g., spark delivery) to crankshaft angle of peak cylinder pressure in the cylinder receiving the fuel as determined at 424. Method 400 proceeds to 430.

At 430, method 400 determines an end of fuel injection crankshaft angle. Method 400 may determine the end of fuel injection crankshaft angle via the following equation:

$$EOI = Ign\_ang - Ign\_dly$$

where EOI is the end of fuel injection crankshaft angle, Ign_ang is the ignition angle as determined at 428, and Ign_dly is the delay from end of fuel injection to ignition as determined at 422. Method 400 proceeds to 432.

At 432, method 400 delivers fuel to the cylinder that is presently on its expansion stroke and is the latest cylinder to enter its expansion stroke. The fuel is delivered in the amount determined at 418 and so that fuel injection ends at the timing determined at 430. In addition, spark is delivered to the cylinder at the ignition angle that was determined at 428. Method 400 returns to 404.

In this way, method 400 may inject fuel to a cylinder that is on an expansion stroke after an engine stop has been requested and after fuel injection to engine cylinders has ceased. By injecting fuel into an exhaust stroke rather than into a compression stroke, the cylinder receiving the fuel may rotate only a small amount and exhaust at least a portion of exhaust gases so that the engine does not stop at an undesirable crankshaft angle with exhaust gas trapped in a cylinder that is on an expansion stroke. This may allow the engine to be restarted via injecting fuel into an expansion stroke of a cylinder that contains air instead of exhaust gases. Consequently, the engine may be repositioned at engine stop without sacrificing the ability to start the engine with expansion combustion during a subsequent engine restart.

Thus, the methods of FIG. 4 provides for a method for operating a vehicle, comprising: injecting a fuel to a cylinder that is on an expansion stroke, the fuel injected in response to an engine stop request, engine speed being greater than a first threshold speed and less than a second threshold speed, and fuel injection to the engine being ceased. The method includes where the first threshold speed and the second threshold speed vary with engine position, and further comprise not injecting the fuel to the cylinder that is on the expansion stroke in response to the engine stop request and engine speed being less than the first threshold speed and less than the second threshold speed. The method further comprises combusting the fuel in the cylinder during the expansion stroke. The method includes determining an amount of air that is in the cylinder and determining an amount of the fuel to inject to the cylinder. The method includes determining a desired engine speed increase that is a result of expansion combustion in the cylinder. The method includes where the desired engine speed increase is a function of engine speed, barometric pressure, engine metal temperature, and engine oil temperature. The method further comprises combusting the fuel via a spark, the spark generated at a crankshaft angle that is a function of an exhaust valve opening angle, desired engine speed increase, and angle and the estimate of air trapped in the cylinder. The method includes where the crankshaft angle is also a function of a location of a peak cylinder pressure during the expansion stroke.

The method of FIG. 4 also provides for a method for operating a vehicle, comprising: injecting a fuel to a cylinder that is on an expansion stroke, the fuel injected in response to an engine stop request, engine speed being greater than a first threshold speed and less than a second threshold speed, and fuel injection to the engine being ceased, where the fuel is injected at a crankshaft angle that is based on a desired crankshaft angle delay from end of fuel injection timing to timing of ignition of the fuel. The method further comprises combusting the injected fuel and rotating the cylinder through bottom-dead-center of the expansion stroke. The method further comprises starting the engine via injecting fuel into a cylinder that is adjacent to the cylinder according to an order of combustion for the engine, the cylinder that is adjacent to the cylinder being on an expansion stroke when injecting fuel into the cylinder that is adjacent to the cylinder. The method includes where the engine is not rotating when injecting fuel into the cylinder that is adjacent to the cylinder. The method includes where the desired crankshaft angle delay from end of fuel injection timing to timing of ignition of the fuel is based on fuel rail pressure.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, 13, 14, 15, V6, V8, V10, and V12 engines operating in natural gas, gasoline, diesel, or alternative fuel configurations could use the present description to advantage.

The invention claimed is:

1. A method for operating an engine, comprising:
in response to an engine stop request, ceasing fuel injection to the engine and subsequently injecting fuel into a cylinder that is on an expansion stroke prior to the engine ceasing rotation in response to the engine stop request, the injecting the fuel in further response to engine speed being greater than a first threshold speed and less than a second threshold speed; and combusting the fuel injected during the expansion stroke to rotate the engine past one or more crankshaft angles before the engine ceases rotation in response to the engine stop request.

2. The method of claim 1, where the first threshold speed and the second threshold speed are based on rotational energy of the engine in order to cease rotation outside of undesirable crankshaft angles, and the first threshold and second threshold vary with engine position, and further comprising:
  not injecting the fuel to the cylinder that is on the expansion stroke in response to the engine stop request and engine speed being less than the first threshold speed and less than the second threshold speed.

3. The method of claim 1, wherein combusting the fuel in the cylinder during the expansion stroke occurs while an engine speed is decreasing in response to the engine stop request.

4. The method of claim 1, further comprising determining an amount of air that is in the cylinder receiving fuel injection during the expansion stroke and determining a desired engine speed increase that is a result of expansion combustion in the cylinder to rotate the engine through an undesirable engine crankshaft stopping position in response to the engine stop request.

5. The method of claim 4, where the desired engine speed increase is a function of engine speed, barometric pressure, engine metal temperature, and engine oil temperature.

6. The method of claim 1, further comprising combusting the fuel via a spark, the spark generated at a crankshaft angle that is a function of an exhaust valve opening angle, desired engine speed increase, and angle and the estimate of air trapped in the cylinder.

7. The method of claim 6, where the crankshaft angle is also a function of a location of a peak cylinder pressure during the expansion stroke.

8. A vehicle system, comprising:
  an internal combustion engine; and
  a controller including executable instructions stored in non-transitory memory for:
    in response to an engine stop request, ceasing fuel injection to the engine and subsequently injecting fuel to a cylinder of the internal combustion engine that is on an expansion stroke prior to the engine ceasing rotation in response to the engine stop request, the injecting fuel in further response to a speed of the internal combustion engine being above a first speed threshold and below a second speed threshold; and
    combusting the fuel injected during the expansion stroke to rotate the engine past an undesirable engine crankshaft stopping position to a crankshaft angle at which the engine ceases rotation in response to the engine stop request.

9. The vehicle system of claim 8, further comprising additional executable instructions to determine a delay time between an end of injecting the fuel to the cylinder and generating a spark in the cylinder.

10. The vehicle system of claim 9, further comprising additional executable instructions to determine a delay time from a time of generating the spark to a time of a peak pressure in the cylinder during the expansion stroke.

11. The vehicle system of claim 10, further comprising additional executable instructions to determine an advance of the peak pressure in the expansion stroke from a first subsequent exhaust valve opening time for the cylinder after the peak pressure is generated.

12. The vehicle system of claim 8, wherein the first speed threshold and the second speed threshold are based on rotational energy of the engine in order to cease rotation at desired crankshaft angles, and
  further comprising additional executable instructions to:
    not inject the fuel in response to in response to the speed of the internal combustion engine being below the first speed threshold, and
    restarting the engine after the ceasing of rotation using combustion during an expansion stroke.

13. The vehicle system of claim 8, where the speed of the engine is determined within a predetermined crankshaft angular window of the expansion stroke.

14. The vehicle system of claim 8, further comprising additional instructions to estimate a cylinder air charge in the cylinder after the engine stop request.

15. A method for operating an engine, comprising:
  in response to an engine stop request, ceasing fuel injection to the engine and subsequently injecting fuel to a cylinder that is on an expansion stroke prior to the engine ceasing rotation in response to the engine stop request, the injecting fuel in further response to engine speed being greater than a first threshold speed and less than a second threshold speed, where the fuel is injected at a crankshaft angle that is based on a desired crankshaft angle delay from end of fuel injection timing to timing of ignition of the fuel; and
  combusting the fuel injected on the expansion stroke to increase energy of the engine to change a crankshaft angle at which the engine ceases rotation in response to the engine stop request.

16. The method of claim 15, wherein the combusting the injected fuel rotates the cylinder through bottom-dead-center of the expansion stroke before the engine ceases rotation in response to the engine stop request.

17. The method of claim 16, further comprising starting the engine from the changed crankshaft angle, the starting via injecting fuel into a cylinder that is adjacent to the cylinder which received fuel injection during the expansion stroke.

18. The method of claim 17, where the engine is not rotating when injecting fuel into the cylinder that is adjacent to the cylinder.

19. The method of claim 15, where the desired crankshaft angle delay from end of fuel injection timing to timing of ignition of the fuel is based on fuel rail pressure.

20. The method of claim 15, where first threshold speed and second threshold speed are based on the engine stopping or rotating through one or more undesirable crankshaft angles with exhaust gas trapped in a cylinder or a top dead center position and stopping the engine at a crankshaft angle that allows the engine to be restarted via injecting fuel into an expansion stroke of a second cylinder.

* * * * *